UNITED STATES PATENT OFFICE.

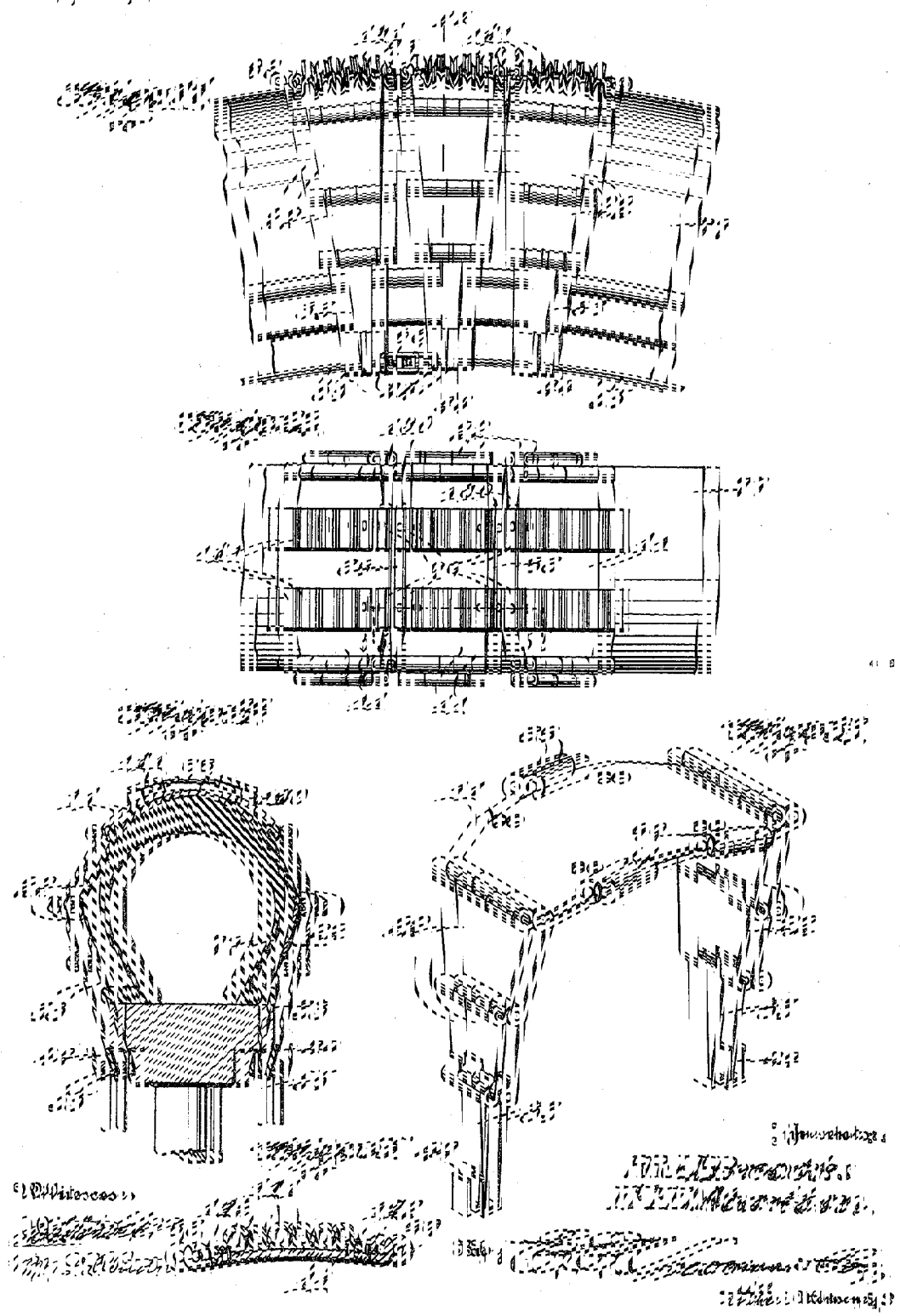

ROBERT JOHNSON BROOKS AND FELIX EMERY MARTIN, OF MALVERN, ARKANSAS.

ARMOR FOR AUTOMOBILE-TIRES.

1,210,594. Specification of Letters Patent. Patented Jan. 2, 1917.

Application filed December 28, 1915. Serial No. 69,079.

*To all whom it may concern:*

Be it known that we, ROBERT J. BROOKS and FELIX E. MARTIN, citizens of the United States, residing at Malvern, Arkansas, have invented certain new and useful Improvements in Armors for Automobile-Tires, of which the following is a specification, reference being had therein to the accompanying drawing.

This invention relates to an armor for automobile tires and has for its principal object the production of a simple and efficient device which may be readily attached to an automobile tire of the pneumatic form.

Another object of this invention is the production of a simple and efficient tire armor which comprises a plurality of sections which are so connected together as to conveniently and efficiently conform to the contour of the tire.

With these and other objects in view, this invention consists of certain novel combinations, constructions and arrangements of parts as will be hereinafter fully described and claimed.

In the accompanying drawings: Figure 1 is a side elevation of a portion of the tire showing the protector sections and the tread plates thereon. Fig. 2 is a top plan view of a plurality of these sections connected together. Fig. 3 is a detailed perspective of the frame of one of the sections. Fig. 4 is a section taken on the line 4—4 of Fig. 1. Fig. 5 is a longitudinal section taken on line 5—5 of Fig. 2.

Referring to the drawings it will be seen that the present invention comprises a plurality of similarly constructed sections which are hinged together as will be hereinafter fully described. It will be seen that 1 designates the outer plate to which is hingedly secured upon each end thereof a plurality of side plates 2. A retaining hook 3 is pivotally connected to the inner end of the side plates 2 as illustrated clearly in Fig. 3 of the drawings and this hook 3 is provided with an out-turned end 4 for the purpose of constituting a socket for receiving the retaining band 5 as illustrated clearly in Fig. 1 of the drawings. This band 5 is adapted to pass entirely around the wheel and fit within the respective hooked portions 4 and the respective ends of this rod or band 5 are connected by means of a turn-buckle 6 to permit the rod to be readily and conveniently adjusted in order that the respective armor sections may be firmly held upon the pneumatic tire 7.

By carefully considering Figs. 2 and 3, it will be seen that each outer section 1 is provided with a hinge-ear 8 upon one side and a plurality of hinge-ears 9 upon the opposite side thereof, the ear 8 of one section being adapted to fit between the ears 9 of the adjoining section. A pintle 10 is then passed through the hinge-ears 8 and 9 for hingedly connecting the sections together in order that the sections may give, one with respect to the other, under the yielding motion of the pneumatic tire 7 upon which the device is placed.

It of course should be understood that suitable tread plates may be carried upon the outer face of the outer plate 1 and as illustrated clearly in Figs. 1, 2 and 5, there is preferably employed a pair of corrugated spring metal plates 11 which have their ends riveted or otherwise secured to the top plate 1 by means of the rivets 12. It should be understood that the corrugated plates 11 will constitute an efficient grip for biting into the road over which the tire is passing and thereby prevent any skidding motion of the tire. Although the outer plates 1 are curved so as to fit snugly upon a tire, they do not extend beyond the side surfaces of the tire, as shown in Fig. 4. The side plates 2 and hooks 3 are straight throughout their entire lengths, as shown in Fig. 4. Therefore, the side plates 2 connected to the outer plates 1 bear upon the tire 7 adjacent their ends secured to the outer plates 1. The opposite ends of the side plates 2 connected to the outer plates 1 project for a considerable distance beyond the side surfaces of the tire 7. As is well known, the neck of a pneumatic tire 7 is much thinner and weaker than the tread of the tire. Therefore, the side plates 2 which are in turn connected to the side plates attached to the outer plates 1 are held spaced from the central side portions of the tire 7, as shown in Fig. 4. As a consequence, it will be seen that as the tire is compressed, or as it expands, the pivotal connections of the plates 2 and hooks 3 will not cut or wear the tire at its weak portions, since the pivoting of the plates will take place at distances from the sides of the tire.

From the foregoing description it will be seen that an armor for a pneumatic tire constructed in accordance with the present invention may be readily placed upon the tire through the medium of the retaining band 5 and further that these sections of the tire armor may be readily disengaged from each other by removing the pintle 10, should one of the sections become injured. It should be further understood that a very simple and efficient mechanism has been produced which may be very cheaply and conveniently manufactured in view of the fact that the several sections may be punched out from blank sheets of metal. By carefully considering Fig. 1, it will be seen that the side plates 2 taper toward their inner ends so as to permit the pneumatic tire 7 to be compressed and permit the sections of the armor to swing toward each other.

What we claim is:—

A tire armor of the class described, comprising a plurality of outer plates, means for pivotally securing said outer plates together, said outer plates being curved so as to fit snugly upon the tread of a tire, side plates pivotally secured to said outer plates, said side plates being straight throughout their entire lengths, whereby only the portions of said side plates adjacent the ends secured to said outer plates will engage a tire, thereby causing the remaining ends of said side plates to project beyond the side surfaces of the tire, side plates pivotally secured to said first-mentioned side plates, hooks pivotally secured to said last-mentioned side plates, means engaging said hooks for holding said armor upon the tire, the projecting ends of said first-mentioned side plates holding the last-mentioned side plates, and said hooks spaced from the side of the tire, whereby as the tire is depressed or expanded, said second-mentioned plates and said hooks will be held from wearing upon the sides of the tire.

In testimony whereof we hereunto affix our signatures.

ROBERT JOHNSON BROOKS.
FELIX EMERY MARTIN.

Copies of this patent may be obtained for five cents each, by addressing the "Commissioner of Patents, Washington, D. C."